(12) United States Patent
Yasuda

(10) Patent No.: US 11,712,031 B2
(45) Date of Patent: Aug. 1, 2023

(54) FISHING REEL

(71) Applicant: GLOBERIDE, Inc., Tokyo (JP)

(72) Inventor: Hiromu Yasuda, Tokyo (JP)

(73) Assignee: GLOBERIDE, Inc., Tokyo (JP)

(*) Notice: Subject to any disclaimer, the term of this patent is extended or adjusted under 35 U.S.C. 154(b) by 124 days.

(21) Appl. No.: 17/192,950

(22) Filed: Mar. 5, 2021

(65) Prior Publication Data

US 2022/0061292 A1 Mar. 3, 2022

(30) Foreign Application Priority Data

Aug. 27, 2020 (JP) ................................ 2020-143236

(51) Int. Cl.
| | | |
|---|---|---|
| *A01K 89/01* | (2006.01) | |
| *A01K 97/12* | (2006.01) | |
| *G05B 15/02* | (2006.01) | |
| *A01K 89/015* | (2006.01) | |

(52) U.S. Cl.
CPC .......... *A01K 97/125* (2013.01); *A01K 89/015* (2013.01); *G05B 15/02* (2013.01)

(58) Field of Classification Search
CPC .............. A01K 89/0155; A01K 89/017; A01K 89/033; A01K 97/125; H04B 1/3827
See application file for complete search history.

(56) References Cited

U.S. PATENT DOCUMENTS

| | | |
|---|---|---|
| 2005/0211812 A1 | 9/2005 | Nakagawa et al. |
| 2009/0172992 A1 | 7/2009 | Nakagawa et al. |
| 2016/0100044 A1 | 4/2016 | Miyamae |
| 2017/0208785 A1* | 7/2017 | Ishikawa ............ A01K 89/0155 |
| 2021/0298284 A1* | 9/2021 | Yasuda ............... A01K 89/0155 |

FOREIGN PATENT DOCUMENTS

| | | | | |
|---|---|---|---|---|
| CN | 1672507 A | | 9/2005 | |
| EP | 2556748 A1 | * | 2/2013 | ....... A01K 89/01555 |
| JP | 2016-73270 | | 5/2016 | |
| JP | 2017127284 A | | 7/2017 | |
| JP | 2019193597 A | * | 11/2019 | ......... A01K 89/0155 |
| JP | 2021029183 A | * | 3/2021 | ........... A01K 89/017 |
| KR | 20130024765 A | * | 8/2012 | ........... A01K 89/017 |

OTHER PUBLICATIONS

Chinese Office Action in connection with Chinese Patent Application No. 202110244200.1; action dated Sep. 9, 2022; (21 pages).
Lu, et al.; "Prerequisite Course Textbook of College Physics"; University of Science and Technology of China Press; 2017; (14 pages).
Second Chinese Office Action in connection with Chinese Patent Application No. 202110244200.1; action dated Mar. 27, 2023; (7 pages).
Office Action for related Japanese Application No. 2020-143236; action dated Jun. 6, 2023; (6 pages).

* cited by examiner

*Primary Examiner* — Emmanuel M Marcelo
(74) *Attorney, Agent, or Firm* — K&L Gates LLP

(57) ABSTRACT

A fishing reel includes a spool capable of winding a fishing line, a detector capable of detecting the rotation amount of the spool, a storage that records the rotation amount of the spool as a detection result, and a transmitter that transmits the detection result to the outside, and is configured to select the casting mode when the detection result of the rotation amount of the spool is equal to or greater than a first threshold, and to select the drop mode when the detection result of the rotation amount of the spool is less than the first threshold.

8 Claims, 7 Drawing Sheets

FISHING REEL

TECHNICAL FIELD

This disclosure relates to a fishing reel capable of performing data communication.

BACKGROUND

Various realization methods have been known for reels that communicate with external devices. As such a fishing reel, for example, Japanese Patent Application Publication No. 2016-073270 discloses, in connection with a technique of remotely controlling an electric fishing reel powered by a motor to wind a fishing line, a configuration to remotely control the electric fishing reel through Bluetooth (registered trademark) or Wi-Fi (Wireless Fidelity) using a smartphone or mobile phone as a remote control terminal.

More specifically, Japanese Patent Application Publication No. 2016-073270 discloses a remote control system that remotely controls an electric fishing reel by wireless communication with a communication terminal pre-equipped with a wireless communication module that is compliant with the Near Field Communication standard for digital equipment and/or compatible with Wi-Fi, wherein the electric fishing reel is provided with a wireless communication module compatible with the wireless communication module of the communication terminal, to the communication terminal a program is installed that, when a command for controlling the electric fishing reel by a user interface thereof is selected, transmits said command to the electric fishing reel, and upon the start of the program by the communication terminal, the electric fishing reel transmits the connection request signal with the device ID of the reel to the communication terminal and then, the communication terminal transmits, upon the receipt of the connection request signal by the communication terminal, a connection permission signal to the electric fishing reel with said device ID to establish a communication protocol, and, thereafter, the electric fishing reel and the communication terminal continue to mutually transmit and receive keep-alive signals until the program is terminated.

A spool rotates at high speed upon casting a rig such as a lure. When detecting and recording that operation, frequent processing is required. However, performing such processing and communication processing with an external device simultaneously poses a problem that the overall processing load becomes excessive. Japanese Patent Application Publication No. 2016-073270 discloses that it is possible to communicate between the reel and the external device, but does not disclose how to perform the both processes.

It could therefore be helpful to provide a fishing reel capable of performing communication processing with an external device while minimizing obstruction to detection processing.

SUMMARY

I thus provide:

A fishing reel may include a spool capable of winding a fishing line, a detector (detecting unit or detecting portion) capable of detecting the rotation amount of the spool, a storage (storing unit or storing portion) that records the rotation amount of the spool as a detection result, and a transmitter (transmitting unit or transmitting portion) that transmits the detection result to the outside, and is configured to select the casting mode when the detection result of the rotation amount of the spool is equal to or greater than the first threshold, and to select the drop mode when the detection result of the rotation amount of the spool is less than the first threshold.

A fishing reel may be configured to select the casting mode when the detection result of the rotation amount of the spool is equal to or greater than the first threshold, and then to shift to the drop mode when the detection result of the rotation amount of the spool is less than the first threshold.

The casting mode may be a state in which transmission from the transmitter to the outside is disabled.

The drop mode may be a state in which transmission from the transmitter to the outside is enabled.

The storage may record a detection result at every predetermined sampling time, and the sampling time in the casting mode is shorter than that in the drop mode.

A mode management system of a fishing reel may be configured to include an information processing device having any of the above-mentioned fishing reels, a receiver (receiving unit or receiving portion) that receives the detection results, and an output portion (output unit) that outputs the detection results.

The information processing device may be configured to include an indicator (indicating unit or indicating portion) that displays detection results.

The information processing device may be configured to be a portable device.

Performing communication processing with an external device when processing load is low makes it possible to perform detection/storage processing and communication processing with an external device upon casting in an appropriate and reliable manner.

DESCRIPTION OF THE NUMERICAL REFERENCES

Figures 1A, 1B, 1C, 1D:
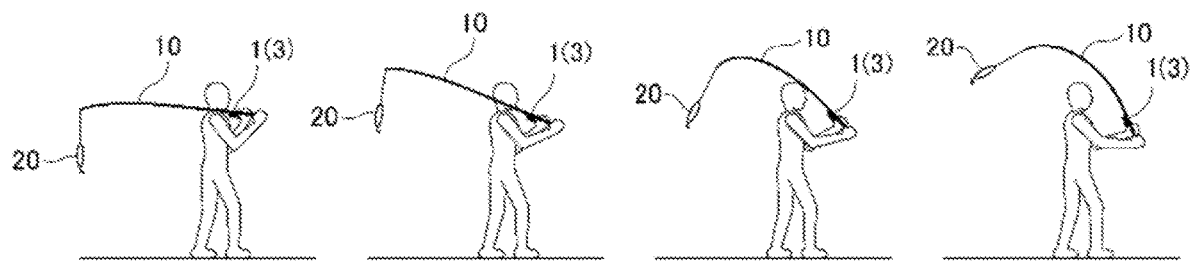
FIGS. 1(a)-1(g) are diagrams illustrating the outline of a casting procedure upon casting of a fishing lure according to an example.

1 Fishing reel
2 Clutch
3 Spool
4 Operation portion
5 Rotation detector
6 Casting preparation commencement detector
7 Casting completion detector
8 History data generator
9 Storage
10 History data
11 Spool rotation amount
12 Time change in braking force on a spool 13 Fishing line reaching distance
14 Maximum speed of a fishing line
15 Daily casting history
16 Reel use history
17 Braking force control means
18 Fishing line retrieval detector
19 Output portion
20 Transmitter
21 Receiving means
22 Output portion
23 Information processing device
24 Indicator

DETAILED DESCRIPTION

Hereinafter, examples of my fishing reels will be described in detail with reference to the accompanying drawings. Components common in the plurality of drawings are denoted by the same reference numerals through the plurality of drawings. Each of the drawings is not necessarily scaled for convenience of explanation.

Typical usage using a general reel including my reels can be roughly divided into two types, those for casting a rig mainly in the horizontal direction, and for dropping a rig downward in the vertical direction.

First, an example of a procedure for casting fishing tools such as a lure using a general reel including my reels will be described with reference to FIGS. 1(a)-1(g). Casting is generally used when aiming to deliver a rig such as a lure and a hook horizontally to a distance toward a target fish.

First, as shown in FIG. 1(a), a lure 20 is adjusted by a reel 1 to a predetermined length from the rod tip of a fishing rod 10, a clutch 2 of the reel 1 (not illustrated) is turned off to make it a spool-free state. At this time, a spool 3 of the reel 1 is pressed by a thumb so that the fishing line is not unwound due to the self-weight of the lure 20 or the like.

Next, as shown in FIGS. 1(b) to 1(d), the initial speed is given to the lure 20 by swinging the fishing rod 10. Then, as shown in FIG. 1(e), the lure 20 can be cast when releasing the thumb from the spool 3 at the timing where the lure speed and the unwinding direction become appropriate.

Figures 1E, 1F, 1G:
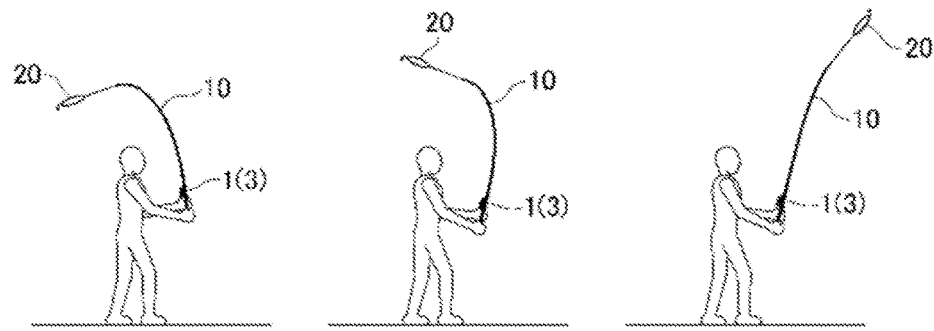

Further, as shown in FIG. 1(g), after casting, the lure 20 starts decelerating, receiving tension from the fishing line and air resistance. On the other hand, the spool 3 starts rotating backward due to tension from the fishing line. When the unwinding speed of the fishing line coincides with the flying speed of the lure 20, the spool 3 rotates at a maximum speed, and the fishing line loses tension. The lure 20 continues to decelerate thereafter due to air resistance and the like. Then, if the spool 3 continues to rotate at high speed due to inertia, the unwinding speed of the fishing line exceeds the flying speed of the lure 20.

As a result, the fishing line is excessively reeled out, and entangled in the reel 1. To avoid this, predetermined braking force can be applied to the spool 3 by a fishing reel 5. Further, the appropriateness of the braking force can be judged from the changes in speed in flying. Therefore, casting conditions can be controlled by measuring and recording the changes in speed.

Figure 2:
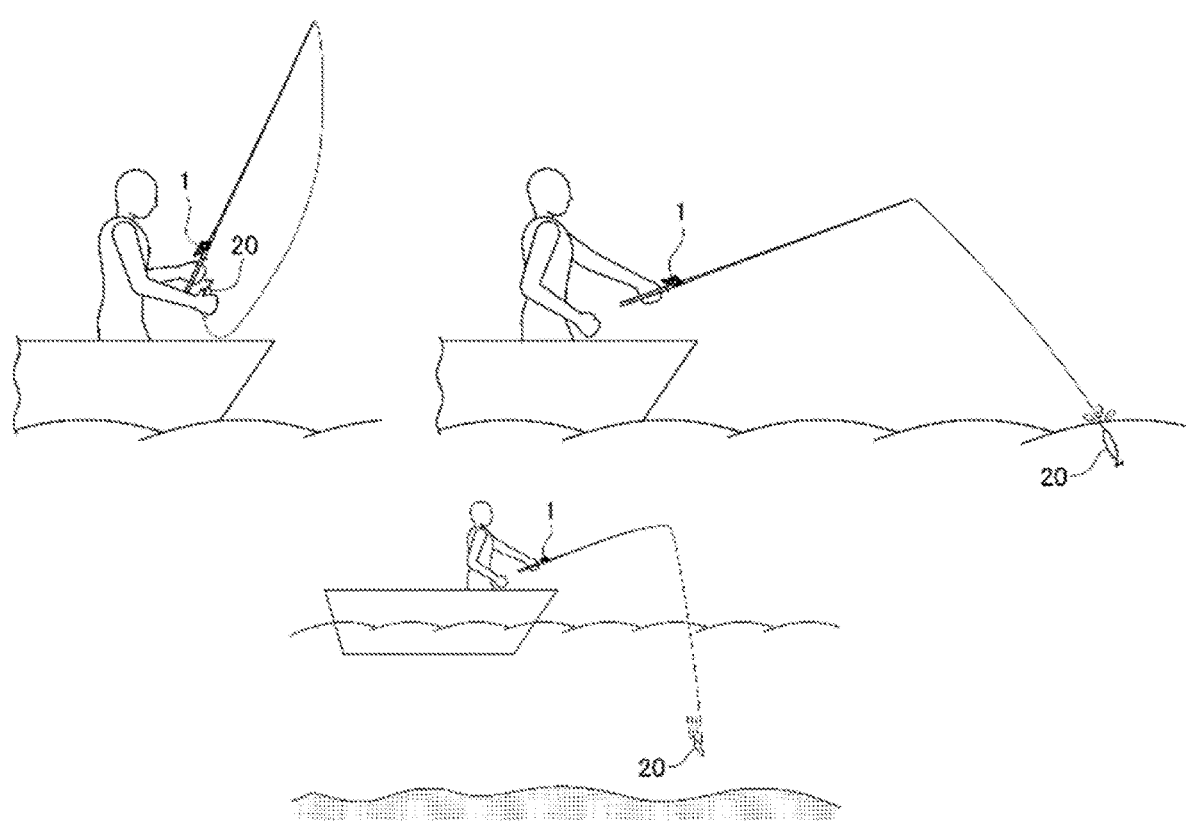
FIG. 2 is a diagram illustrating a procedure of dropping a fishing lure rig according to an example.

Next, dropping of a rig (dropping) will be described with reference to FIG. 2. The dropping of a rig here is generally used when delivering a rig such as a lure and a hook toward a target fish living near the sea floor from a fishing boat or a deep water quay.

First, a user makes preparations by, for instance, baiting a hook or filling a burley cage with ground bait, or replacing the lure 20, after operating the reel 1 to draw the tip of a hook near him/her. Next, after the completion of the preparations, the clutch is turned off to make the spool 3 a spool-free-state, and the spool 3 is pressed by a thumb. Thereafter, when releasing the thumb from the spool 3 after delivering a weight or the lure 20 toward water surface, the rig drops due to gravity acting on the weight.

Next, the rig stops dropping when reaching the sea floor. The clutch is then connected, and the fishing line is rewound as necessary to wait for a fish to take a bait. In some cases, it is also possible to connect the clutch before the rig reaches the sea floor to wind the lure or the like from halfway. Thereafter, when detecting that a fish takes the hook, or after a predetermined time elapses, the rig is retrieved operating the reel 1.

Since the falling speed of a rig and the winding speed described above vary depending on the fish species and fishing method, a difference may arise in a catch in fishing. Therefore, measuring the speed and recording the speed history improve the catch.

Figure 3:
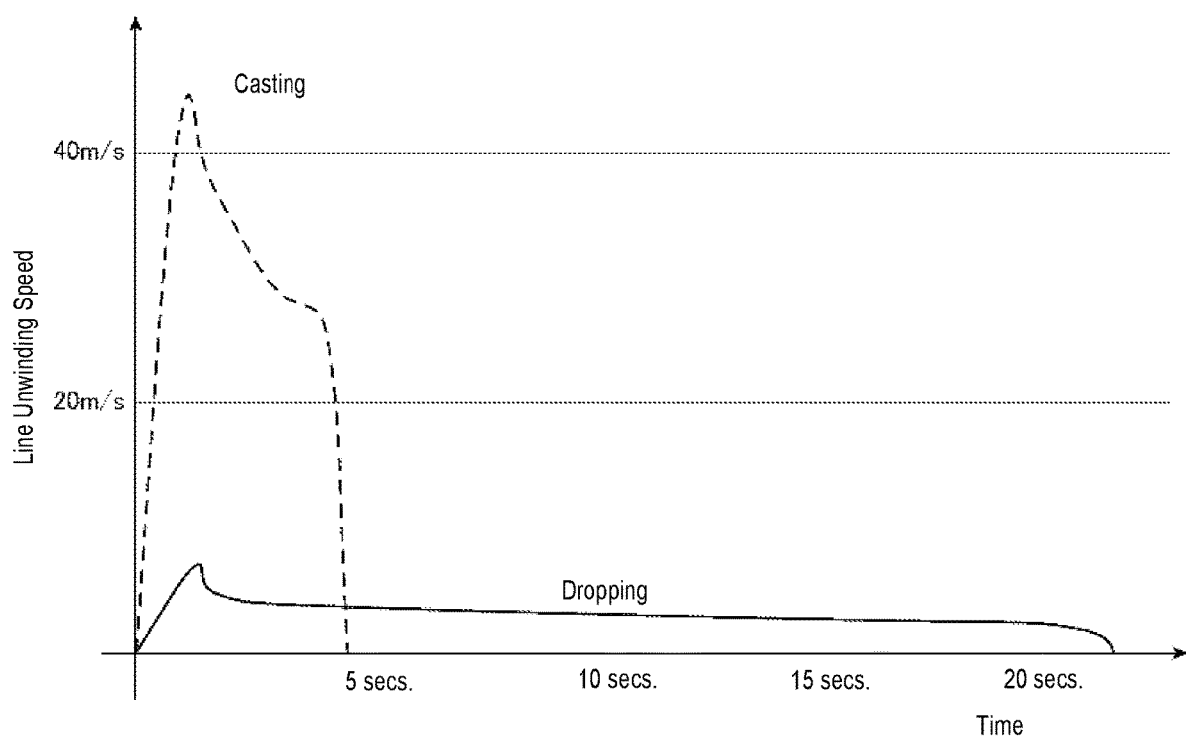
FIG. 3 is a diagram illustrating changes in the unwinding speed of a fishing line unwound from a fishing reel according to an example.

With reference to FIG. 3, the unwinding speeds of a fishing line are compared upon casting and dropping a rig as described above. In FIG. 3, the horizontal axis represents the time elapsed from the commencement of unwinding, and the vertical axis represents the unwinding speed of a line, and the solid line and the broken line show the typical data at the time of dropping and casting, respectively.

When using, for example, a general tackle commonly used in black bath fishing upon casting, the initial speed upon casting is about 55 m/s (about 200 km/h), and the final speed is about 10 m/s. Further, the duration until the water landing is 5 seconds at most, and the amount of a line unwound is about 10 to 100 m.

On the other hand, a dropping speed (of a rig) is slower than a flying speed upon casting where a rig flies in the air due to the viscous resistance of water. Though it may vary depending on, for example, the depth of water, the weight of the weight, and the thickness of a line, the maximum speed is about 4 m/s, which is about $\frac{1}{10}$ of the speed upon casting. Also, the speed change is smaller during dropping than during casting where a rig moves in the air.

The duration until a rig reaches the sea floor greatly varies depending on the depth of water and the rig, but it sometimes takes several minutes if it can take as long as several minutes, and it tends to be longer than when casting. The amount of a line unwound is up to about 1.5 times the depth of water, and varies depending on the topography and the target fish. However, under ordinary conditions, it is often about 10 m to 200 m, which is of a magnitude similar to casting.

In actual fishing, there are instances where both casting and dropping are involved, such as when casting a rig in the horizontal direction, and then submerging the same onto a deep sea floor. Even in this instance, the first step of a rig flying in the air upon casting continues to the second step of the rig falling and submerging itself in water, and it is possible to distinguish one from the other by the unwinding speed of the line.

Some reels have only either of the envisaged use such as electric reels whose envisaged use is usually limited to dropping a rig. However, whether it is used for dropping or casting depends on the fishing method and the user, and the same reel may be used for both cases depending on the type of the reel.

Figure 4:
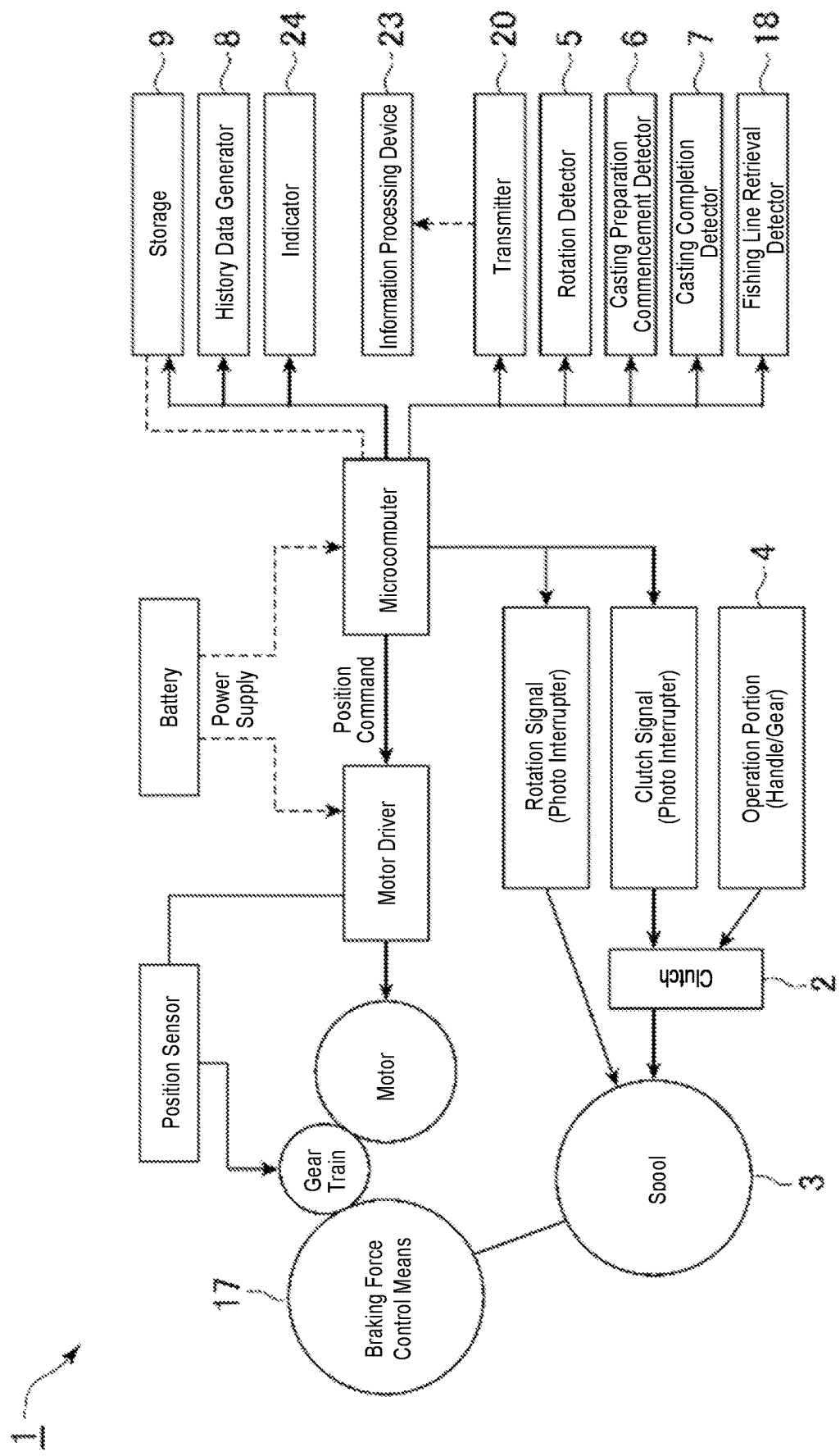
FIG. 4 is a diagram illustrating a fishing reel according to an example.

Next, a fishing reel according to an example will be described with reference to FIG. 4. As illustrated, the fishing reel 1 is configured to include the spool 3 that winds a fishing line, an operation portion (operation unit) 4 that rotates the spool 3, a clutch 2 that switches from the power transmissible mode to the power non-transmissible mode and vice versa between the operation portion and the spool, a rotation detector (rotation detecting unit or rotation detecting portion) 5 that detects the rotation of the spool 3, a casting preparation commencement detector (casting preparation commencement detecting unit or casting preparation commencement detecting portion) 6 that detects the preparation for casting, a casting completion detector (casting completion detecting unit or casting completion detecting portion) 7 that detects the completion of casting, a history data generator (history data generating unit or history data generating portion) 8 that generates history data from the preparation for casting to the completion of casting, and a storage (storing unit or storing portion) 9 that records the history data. It should be noted that some of the foregoing may be outside of the fishing reel, or a receiver provided in an external information communication terminal may receive history data from the storage 9. An output portion (output unit) and an indicator (indicating unit or indicating portion) of the external information communication terminal may output and display history data received. In such a situation, it is called a mode management system of a fishing reel together with the fishing reel.

The spool 3 is rotatably supported with respect to the fishing reel 1, and can wind a fishing line by forward rotation and unwind the wound fishing line by backward rotation. The operation portion 4 is configured, for example, as a handle, and transmits the rotation operation by a user to the spool 3 via a transmission mechanism such as a gear so that the spool 3 can be rotated forward. The operation portion 4 may be a combination of an operation member such as a lever, and a power source such as a motor.

The clutch 2 can be switched between two modes: the "on" mode where power is transmissible and the "off" mode where power is not transmitted. In the "on" mode, the spool 3 can be rotated forward by an operation member 3, and in the "off" mode, the spool 3 can be rotated forward and backward regardless of the state of the operation member 3 (spool-free state).

The rotation detector 5 can be configured by a combination of a detection means such as a photo interrupter and a detected means such as a light shielding plate provided on the spool 3. This allows the rotation of the spool 3 to be converted into an electric signal. The combination of the detection means and the detected means is not limited to the above example, and a known means such as a magnet and a magnetic sensor can be used.

Figure 5:
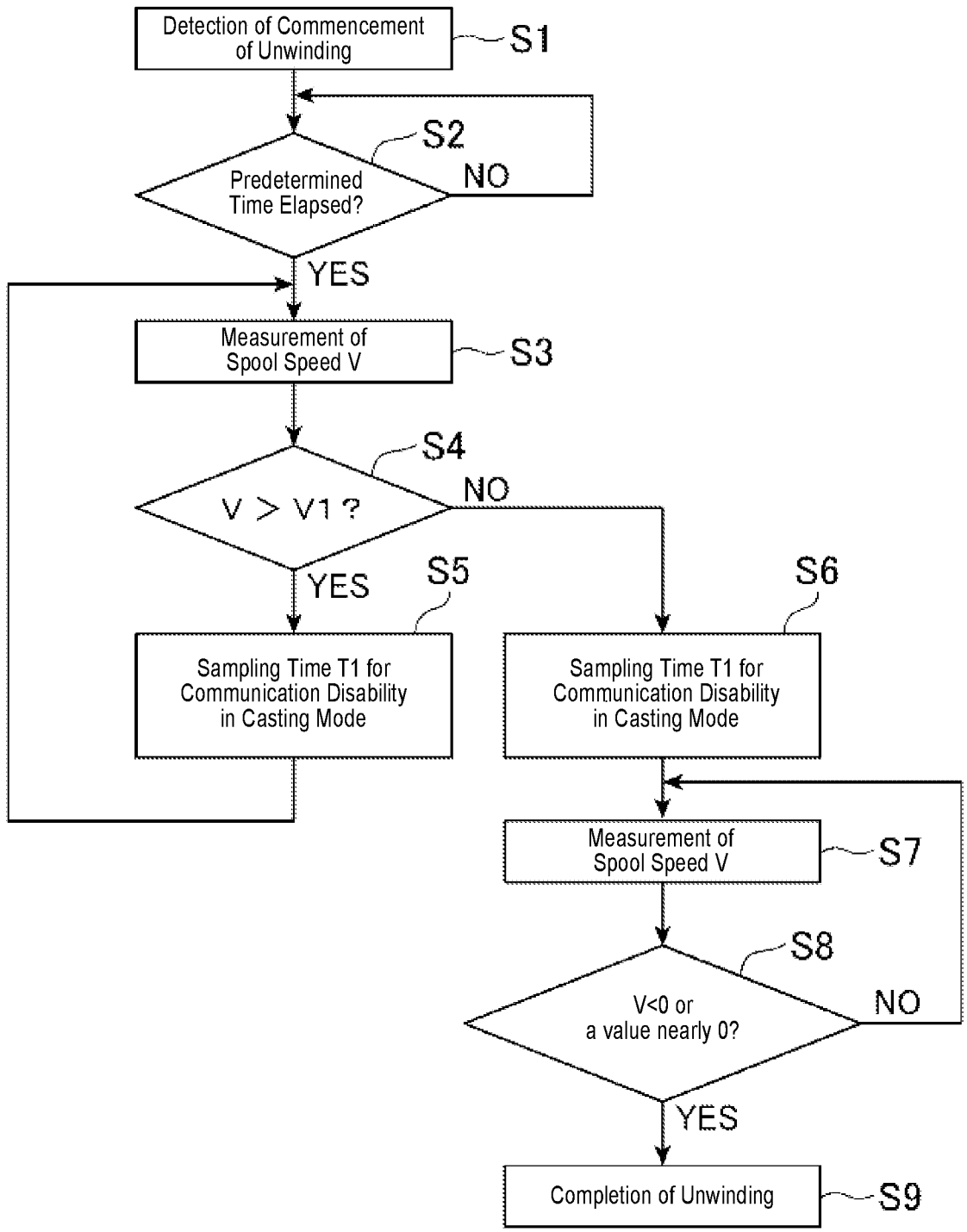
FIG. 5 is a diagram illustrating a mode determination flow of a fishing reel according to an example.

Next, a sequence of detection of the commencement of unwinding of a spool and the subsequent distinction between casting and dropping in the fishing reel 1 according to an example will be described with reference to FIG. 5.

As illustrated, first in step 1, the commencement of unwinding of a fishing line from the spool 3 is detected. Commencement of the unwinding is detected when the commencement of the rotation of the spool 3 is detected after the clutch 2 is disconnected. Further, the detection may also be made when a line length becomes equal to or less than a predetermined value (e.g., 1 m or less from the tip of a rod) and then becomes equal to or greater than the predetermined value, or when the rotation speed of the spool 3 becomes equal to or greater than a predetermined value.

Next, in step 2, when a predetermined time (e.g., 100 ms) elapses, the spool rotation speed at that time is detected. The reason to wait until the predetermined time elapses is because it is practically difficult to judge whether a rig has been casted or dropped since the spool 3 keeps accelerating for a while after the unwinding of a line.

As described above, since the spool rotation speed greatly differs between the casting and dropping, a first threshold V1 (e.g., 5,000 rpm) is set in steps 3 and 4 after a lapse of a predetermined time, and the casting mode is on as in step 5 when the spool speed is higher than the first threshold V1. When the casting mode is on, communication with the outside is disabled. Further, with the sampling time being set to T1, the rotation speed of the spool 3 is measured and recorded every T1ms. Each time, the speed is compared to the first threshold V1, and the mode changes to the drop mode when the speed becomes V1 or less (rig).

Objects cast such as a lure are subject to water resistance after landing on water, and the spool rotation speed is greatly reduced to the threshold V1 or less as described above. When this is detected, the mode changes to the drop mode as shown in step 6. When the drop mode is on, communication with the outside is enabled. Further, the sampling time for measuring and recording the rotation speed of the spool 3 is set to T2 that is longer than T1.

Next, the spool rotation speed is measured and recorded every T2ms in step 7. After moving to the drop mode, the rotation speed of the spool 3 is not accelerated again through the normal use of the reel. Thus, the transition from the drop mode to the casting mode need not be taken into account in practice.

After the mode changes to the drop mode, the rotation speed of the spool 3 is compared to a second threshold V2 (e.g., 200 rpm) in step 8. When it is detected that the rotation speed of the spool 3 becomes equal to or less than V2, it is judged in step 9 that the unwinding of the fishing line is completed. In the event the drop mode is not required such as when fishing in shallow water, the first threshold and the second threshold may be identical. This makes it possible to detect the completion of unwinding directly from the casting mode.

As described above, the speed of the spool 3 is measured and the data is recorded at sampling time T1 in the casting mode, and at sampling time T2 that is longer than T1 in the drop mode, which makes it possible to control each sampling time.

Upon casting, the rotation speed of the spool 3 is large, and the speed may largely change. Therefore, to accurately record the phenomenon, it is necessary to frequently record the data. For example, when recording the speed of the spool 3 every time the fishing line moves 1 m, it is necessary to record in casting more than 10 times as often as (1/10 or less sampling time) in dropping.

On the other hand, in dropping, though the speed and the speed change are smaller than those in casting, the duration may be longer. Therefore, if the data is recorded at the sampling time in casting, the processing load unnecessarily increases, which has adverse effects such as increase in the storage capacity. In particular, the duration of the drop mode can be many times that of the casting mode as described above. Therefore, if the data is recorded at the same sampling time, the storage capacity will also be many times greater, which results in an increase in the communication time when the information needs to be transmitted. Even then, the above-described adverse effects can be avoided by making the sampling time in the drop mode longer than that of the casting mode.

The fishing reel 1 includes the spool 3 capable of winding a fishing line, the detector 5 capable of detecting the rotation amount of the spool 3, the storage 9 that records the rotation amount of the spool as a detection result, and a transmitter 20 that transmits the detection result to the outside, and is configured to select the casting mode when the detection result of the rotation amount of the spool is equal to or greater than a first threshold, and to select the drop mode when the detection result of the rotation amount of the spool is less than the first threshold.

The fishing reel 1 makes it possible to perform detection/storage processing and communication processing with an external device upon casting in an accurate and reliable manner by carrying out the communication processing with the external device when the processing load is low.

The fishing reel 1 is configured to select the casting mode when the detection result of the rotation amount of the spool 3 is equal to or greater than the first threshold, and then to shift to the drop mode when the detection result of the rotation amount of the spool is less than the first threshold.

The fishing reel 1 makes it possible to perform detection/storage processing and communication processing with an external device upon casting in an accurate and reliable manner by carrying out the communication processing with the external device when the processing load is low.

Transmission from the transmitter to the outside may be disabled in the casting mode. Transmission from the transmitter to the outside may be enabled in the drop mode.

The storage means may record a detection result at each predetermined sampling time, and the sampling time in the casting mode is shorter than that in the drop mode.

Figure 6:
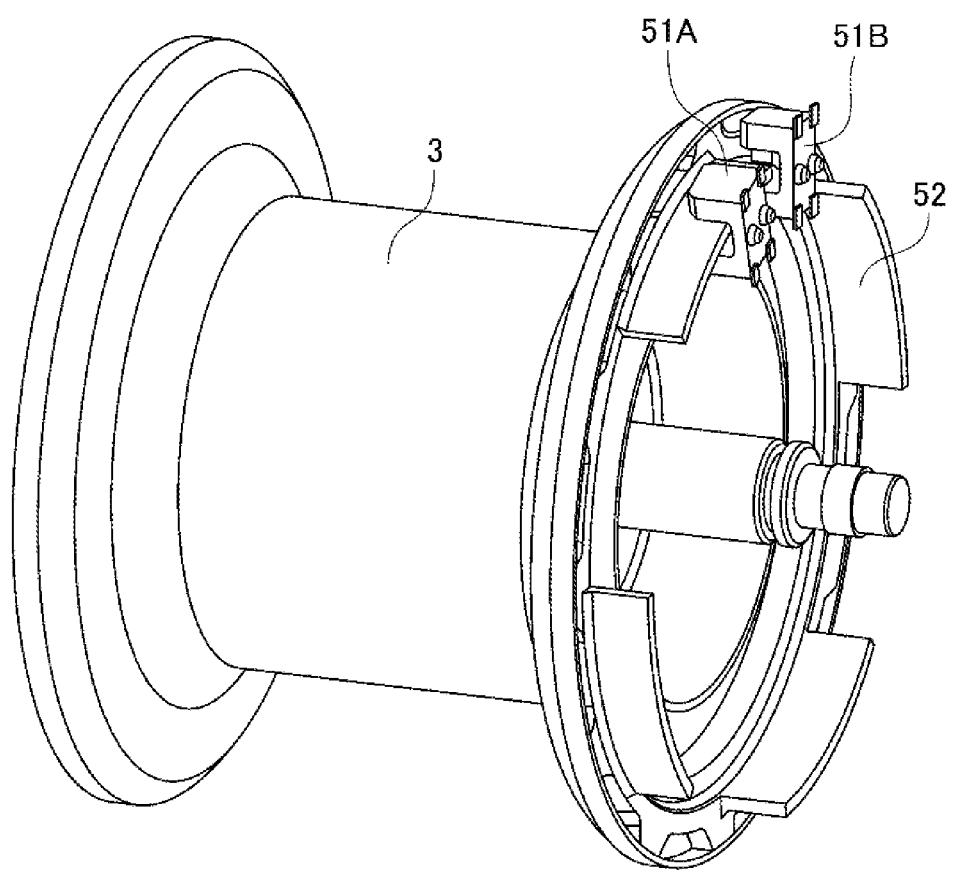
FIG. 6 is a diagram illustrating the detection of the spool rotation speed of a fishing reel according to an example.

Next, the influence on the detection, if any, of the rotation speed of the spool will be described with reference to FIGS. 6 and 7. In the illustrated example, an incremental-type rotary encoder is used as the rotation detector 5, but the example is not limited thereto. The rotation detector 5 includes a first detector 51A, a second detector 51B, and a detected portion 52. A photo interrupter, for example, can be used for the first detector 51A and the second detector 51B. An electric signal can be generated depending on the presence or absence of a light shielding object between a light emitting portion and a light receiving portion that are disposed opposite to each other in a sensor.

As the detected portion 52, a pulse plate in which N (four in the illustrated example) light shielding plates in a ring shape are equally arranged at every $180/N°$ ($45°$ in the illustrated example) is used. At this time, the first detector 51A and the second detector 51B are arranged $90/N°$ apart ($22.5°$ in the illustrated example). The rotation detector 5 is not limited to the above example, but it is desirable to be a non-contact type to avoid the occurrence of sliding friction. Besides the photo interrupter, a reflective photo sensor, a magnetic sensor or the like may also be used. Reflectors, magnets and the like suitable for the detection method can be used as a detected portion.

Figure 7:
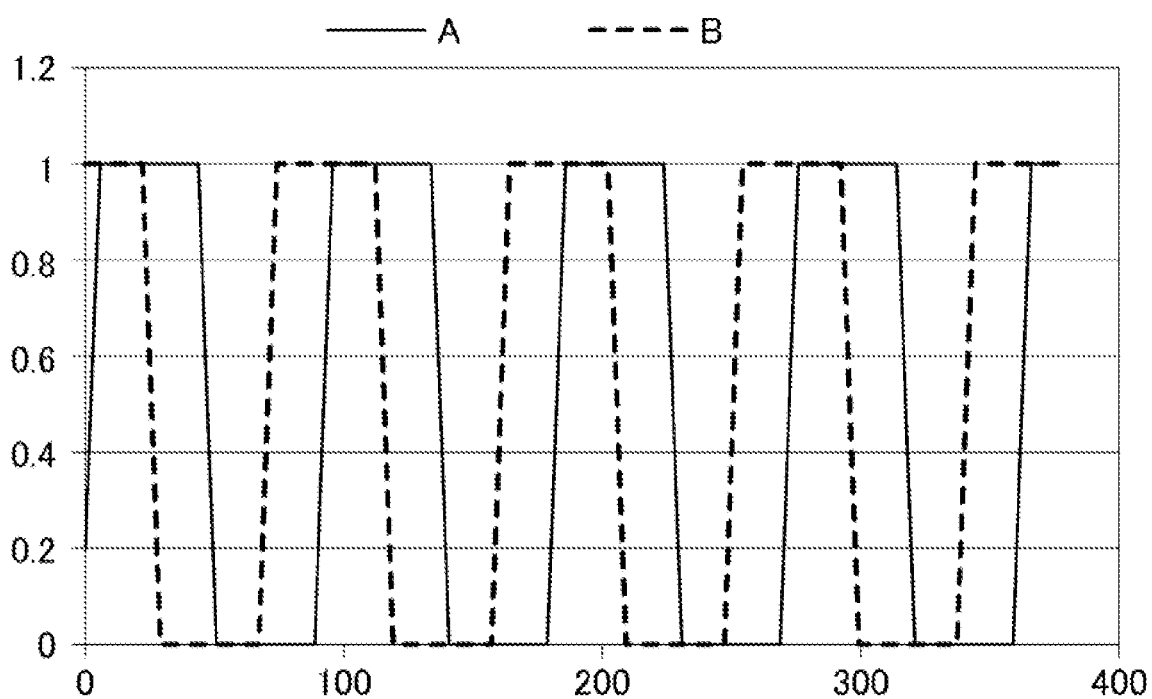
FIG. 7 is a diagram illustrating a signal obtained when a spool of a fishing reel according to an example rotates.

When the spool 3 makes one rotation, a signal as shown in FIG. 7 is obtained by the above configuration. That is, both a signal (phase A) obtained from the first detector 51A and a signal (phase B) obtained from the second detector 51B switch between H and L each time the spool rotates $180/N°$ ($45°$), and the phase A differs from phase B by $90/N°$ ($22.5°$). The rotation direction can be judged from the relationship between phases A and B, and the rotation of the spool 3 at every $90/N°$ ($22.5°$) can be detected.

Next, communication processing performed when the spool 3 is rotating at high-speed will be considered. When the spool is rotating at $\omega$ (°/sec), it takes $90/\omega N$ seconds for the spool 3 to rotate $90/N°$. If a microcomputer cannot detect the states of the phases A and B within said time, it misses the rotation of the spool 3.

Further, when performing data communication with the outside, the microcomputer often does so intermittently. The processing time is assumed to be Tc seconds. When $Tc>90/\omega N$, it is necessary to simultaneously perform data communication processing and spool rotation detection processing, which makes it difficult for a single-tasking microcomputer to do so.

As a specific example of casting, the speed of a cast object is V (m/s), spool diameter D (m) is 35/1000 m, the number of light shielding plates N is 4, and the communication processing time Tc is 1 ms. The time required for the spools 3 to rotate $90/N°$ is $1000 \pi D/4VN$ ms. Since the communication processing must be completed within this period of time, $Tc<100\pi D/4VN$ and $V<1000\pi D/4TcN$. When the above conditions are substituted, and the speed V of the cast object is 6.87 m/s or more, spool rotation detection processing and the communication processing occur simultaneously.

When the threshold V1 upon dropping and casting is set to be equal to or less than said value, the simultaneous occurrence of processing can be avoided by stopping the communication processing in the case of casting. Since the speed is below that at which the simultaneous processing is possible in dropping, spool rotation can be detected even if the communication processing is enabled, which makes it possible to reduce the time lag in communication with an external device. Since the above-mentioned speed varies depending on the spool diameter D, the number of light shielding plates N, and the communication processing time Tc, the communication processing may be disabled even in the drop mode in some instances.

The dimensions, materials and arrangements of each component described herein are not limited to those explicitly described in the examples, and each component can be modified to have any dimension, material and arrangement that can be included within the scope of this disclosure. Further, components that are not explicitly described herein may be added to the described examples, or some of the components described in each example may also be omitted.

What is claimed is:

1. A fishing reel comprising:
   a spool configured to wind a fishing line,
   a detector configured to detect a rotation amount of the spool,
   a storage configured to record the rotation amount of the spool as a detection result, and
   a transmitter configured to transmit the detection result to outside,
   wherein a casting mode is selected when the detection result of the rotation amount of the spool is equal to or greater than a first threshold, and
   wherein a drop mode is selected when the detection result of the rotation amount of the spool is less than the first threshold.

2. The fishing reel according to claim 1, wherein the casting mode is selected when the detection result of the rotation amount of the spool is equal to or greater than the first threshold and, thereafter, the fishing reel is configured to change a mode from the casting mode to the drop mode when the detection result of the rotation amount of the spool becomes less than the first threshold.

3. The fishing reel according to claim 1, wherein transmission from the transmitter to the outside is disabled in the casting mode.

4. The fishing reel according to claim 1, wherein transmission from the transmitter to the outside is enabled in the drop mode.

5. The fishing reel according to claim 1, wherein the storage is configured to record the detection result at every predetermined sampling time, and the sampling time in the casting mode is shorter than that in the drop mode.

6. A mode management system comprising:
   the fishing reel according to claim 1, and
   an information processing device comprising:
      a receiver configured to receive the detection result, and
      an output portion configured to output the detection result.

7. The mode management system according to claim 6, wherein the information processing device further comprises an indicator configured to display the detection result.

8. The mode management system according to claim 6, wherein the information processing device is a portable device.

\* \* \* \* \*

UNITED STATES PATENT AND TRADEMARK OFFICE
CERTIFICATE OF CORRECTION

| | | |
|---|---|---|
| PATENT NO. | : 11,712,031 B2 | Page 1 of 1 |
| APPLICATION NO. | : 17/192950 | |
| DATED | : August 1, 2023 | |
| INVENTOR(S) | : Hiromu Yasuda | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 200 days.

Signed and Sealed this
Eighth Day of April, 2025

Coke Morgan Stewart
*Acting Director of the United States Patent and Trademark Office*